United States Patent
Srivastava et al.

(10) Patent No.: US 10,344,535 B2
(45) Date of Patent: Jul. 9, 2019

(54) REGRESSION RELATIONSHIP APPROACHES

(71) Applicant: Landmark Graphics Corporation, Houston, TX (US)

(72) Inventors: Rae Mohan Srivastava, Toronto (CA); Jeffrey Marc Yarus, Houston, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 295 days.

(21) Appl. No.: 14/890,873

(22) PCT Filed: Aug. 9, 2013

(86) PCT No.: PCT/US2013/054360
§ 371 (c)(1),
(2) Date: Nov. 12, 2015

(87) PCT Pub. No.: WO2015/020672
PCT Pub. Date: Feb. 12, 2015

(65) Prior Publication Data
US 2016/0138339 A1    May 19, 2016

(51) Int. Cl.
*E21B 7/04* (2006.01)
*E21B 43/26* (2006.01)
*E21B 47/022* (2012.01)
*E21B 41/00* (2006.01)
*E21B 47/00* (2012.01)

(52) U.S. Cl.
CPC ............ *E21B 7/04* (2013.01); *E21B 41/0092* (2013.01); *E21B 43/26* (2013.01); *E21B 47/00* (2013.01); *E21B 47/022* (2013.01); *G01V 2210/1429* (2013.01); *G01V 2210/646* (2013.01)

(58) Field of Classification Search
None
See application file for complete search history.

(56) References Cited

U.S. PATENT DOCUMENTS 4,817,061 A    3/1989  Alford et al.
2005/0256645 A1  11/2005  Rabinovich et al.
(Continued)

FOREIGN PATENT DOCUMENTS

WO    WO-2009021010 A2    2/2009
WO    WO-2012121707 A1    9/2012

OTHER PUBLICATIONS

Alain Brie, New Directions in Sonic Logging, Oilfield Review, Spring 1998, pp. 40-55.*
(Continued)

*Primary Examiner* — Tung S Lau

(57) ABSTRACT

The disclosed embodiments include a method, apparatus, and computer program product for improving well production using a regression relationship approach. For example, one disclosed embodiment includes a system that includes at least one processor and at least one memory coupled to the at least one processor and storing instructions that when executed by the at least one processor performs operations for analyzing a first set of data from at least one previously drilled well to predict fracture orientation for determining a drilling angle to optimize drilling of a new well by increasing fracture density along the new wellbore.

20 Claims, 3 Drawing Sheets

(56) References Cited

U.S. PATENT DOCUMENTS

| | | | |
|---|---|---|---|
| 2009/0065198 A1 | 3/2009 | Suarez-Rivera et al. | |
| 2009/0065253 A1 | 3/2009 | Suarez-Rivera et al. | |
| 2010/0250216 A1* | 9/2010 | Narr | G06F 17/5018 703/10 |
| 2011/0120705 A1* | 5/2011 | Walters | E21B 43/16 166/270 |
| 2012/0325462 A1* | 12/2012 | Roussel | E21B 43/26 166/250.1 |
| 2013/0311147 A1* | 11/2013 | Greenwood | G06Q 10/06 703/1 |
| 2016/0069182 A1* | 3/2016 | Neale | E21B 47/16 166/254.2 |
| 2016/0138339 A1* | 5/2016 | Srivastava | E21B 43/26 702/9 |
| 2017/0067337 A1* | 3/2017 | Havens | E21B 47/16 |

OTHER PUBLICATIONS

Tang Jianming, Application of converted-wave 3D/3-C data for fracture detection in a deep tight-gas reservoir, Jul. 2009, pp. 826-837.*

International Search Report and Written Opinion, dated May 9, 2014; 10 pages; Korean International Searching Authority.

Intellectual Property Office of Singapore, Office Action, dated Jun. 28, 2016; 7 pages, Singapore.

* cited by examiner

REGRESSION RELATIONSHIP APPROACHES

CROSS-REFERENCE TO RELATED APPLICATIONS

This application is a U.S. National Stage patent application of International Patent Application No. PCT/US2013/054360, filed on Aug. 9, 2013, the benefit of which is claimed and the disclosure of which is incorporated herein by reference in its entirety.

BACKGROUND OF THE INVENTION

1. Field of the Invention

The present invention generally relates to the field of hydrocarbons, and more particularly, to a system and method configured to improve well production using a regression relationship approach.

2. Discussion of the Related Art

There are many factors that affect well production. One such factor is the porosity and permeability of a reservoir rock. If the number of pores, size of pores, and the pores are interconnected such that fluids flow through them (i.e., the rock is permeable), then the rock is a potential petroleum reservoir. However, even if a reservoir rock has a low porosity value, the reservoir rock may still be an economically producing well if the reservoir is also fractured. These fractures can be described as open cracks or voids within the formation and can either be naturally occurring or artificially generated from a wellbore. The fractures form conduits along which fluids such as gas, petroleum, and groundwater may migrate to the well.

The disclosed embodiments seeks to improve well production by providing, among other things, a system and method configured to determine a drilling angle of a wellbore that is likely to produce an increase in a number of fractures that occur along the wellbore and thereby, increasing well production.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

The disclosed embodiments include a system and method for improving well production using a regression relationship approach. Generally, regression analysis uses data to identify relationships among variables and use these relationships to make predictions. The disclosed embodiment uses regression analysis to predict fracture orientation of a reservoir rock for determining a drilling angle for drilling a new well that yields a high fracture density. An objective of the disclosed embodiments is to better orient horizontal wellbore in which fracturing of the reservoir is intended because successful fracturing is based, in part, on the orientation of the fracture relative to the wellbore.

The disclosed embodiments and advantages thereof are best understood by referring to FIGS. 1-4 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

Figure 1:
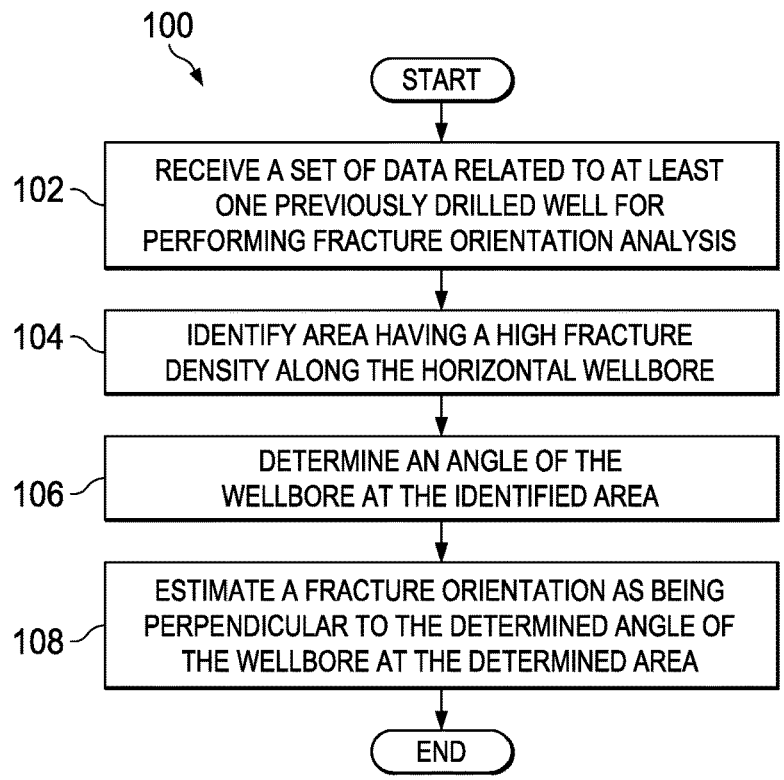
FIG. 1 illustrates an example of a process for using regression analysis to determine fracture orientation of previously drilled wells in accordance with the disclosed embodiments.

FIG. 1 illustrates an example of a process 100 for improving well production using a regression relationship approach for determining fracture orientation based on fracture density in accordance with the disclosed embodiments. The process at step 102 begins by receiving a set of data related to at least one previously drilled well for performing fracture orientation analysis. The set of data may include, among other things, well logs or image logs that image the outer circumference of the reservoir to identify the orientation of the fractures for the previously drilled well(s). The set of data may be stored in one or more databases. In one embodiment, the process may be configured to automatically query the one or more databases for the desired data. Alternatively, the process may be configured to receive the set of data through user input.

Based on the set of data from the at least one previously drilled well, the process, at step 104, performs analysis to identify an area having a high fracture density along the previously drilled horizontal wellbore. The process determines an angle of the wellbore at the identified high fracture density area at step 106. The process, at step 108, is configured to assume that the majority of fractures within the identified high fracture density area are relatively perpendicular to the angle of the wellbore at the identified high fracture density area. In one embodiment, the process may be configured to determine an average orientation of the fractures from the data set.

Figure 2:
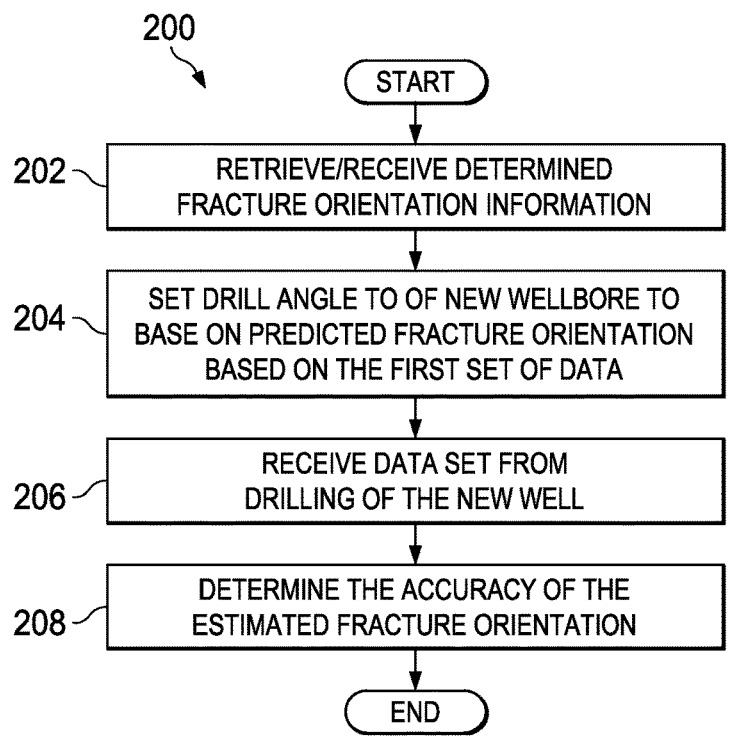
FIG. 2 illustrates an example of a process for drilling a new well in accordance with the disclosed embodiments.

This information is then utilized by process 200, as illustrated in FIG. 2, in drilling a new horizontal wellbore. The process 200 begins by receiving the information regarding the determined fracture orientation of the previously drilled wells. Again, the process may be configured to retrieve (i.e. query) one or more databases in which the data is stored and/or may be configured to receive the information through user input. In certain embodiments, the process may be configured to retrieve and/or receive the determined fracture orientation from only previously drilled wells located within the same region as the new well. For example, as will be further discussed, the fracture orientation may differ substantially between previously drilled wells in the Northeast region and a Southwest region of the United States.

Based on the received information, the process at step 204 is configured to assume that the fracture orientation of the new well coincides with the determined fracture orientation of the previously drilled wells and automatically sets/controls the angle of the wellbore for drilling the new well such that the angle of the wellbore is relatively perpendicular to the assumed/predicted fracture orientation of the reservoir.

Once drilling of the new wellbore is completed, the process at step 206 is configured to receive and analyze the well data such as, but not limited to, the image logs from drilling of the new well. Alternatively, in certain embodiments, the process may be configured to receive and perform the analysis of the well data from drilling of the new well in real time (i.e., while drilling of the new well is in progress). From this analysis, the process at step 208 determines the fracture densities (e.g., number of fractures per foot) along the new wellbore to determine the accuracy of the previously determined/predicted fracture orientation. For instance, if the process determines that there is a good correlation between fracture density and orientation of the wellbore, then the process determines that the previously determined fracture orientation is accurate. Otherwise, the process determines that the previously determined fracture orientation is inaccurate.

Figure 3:
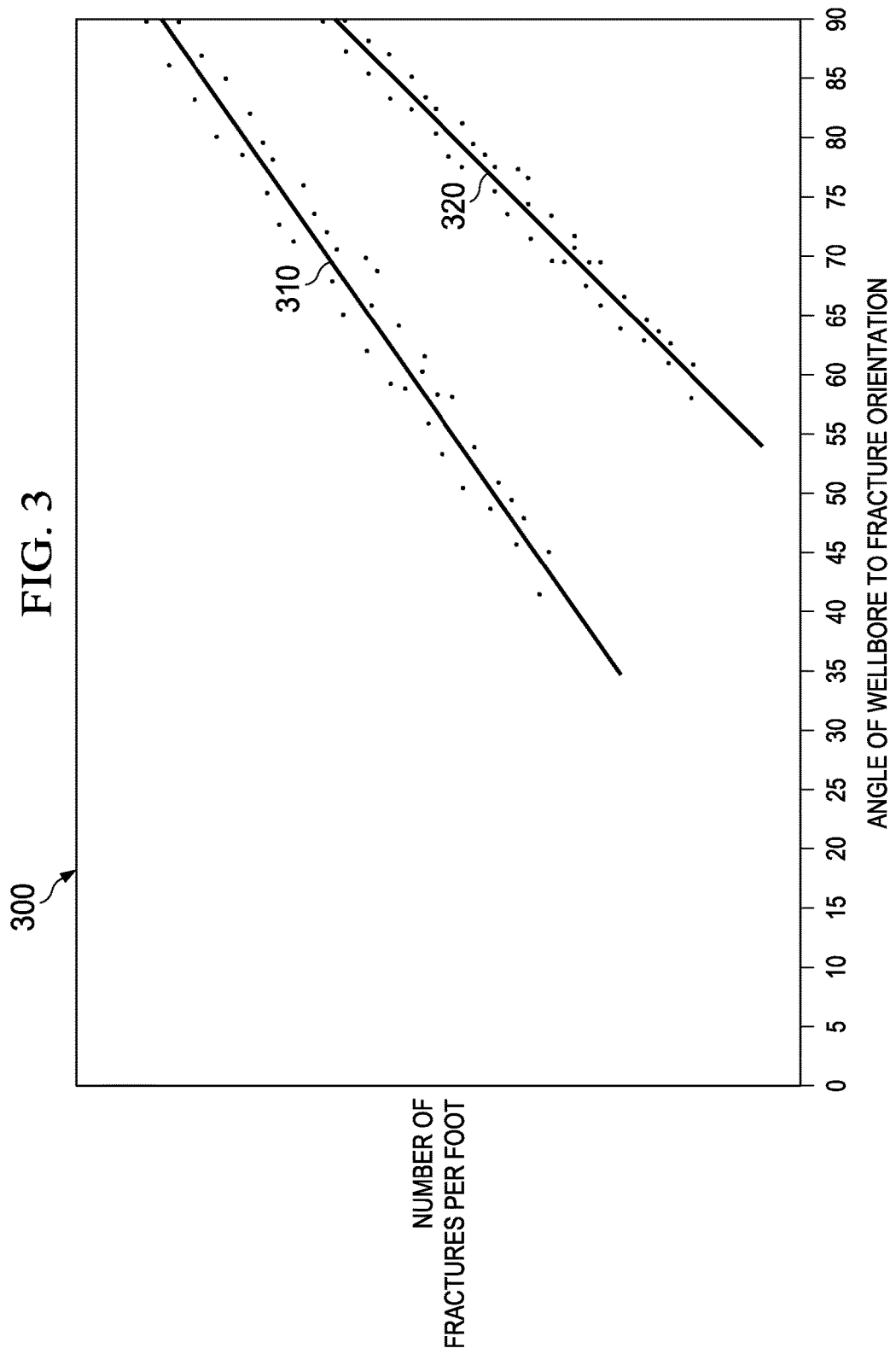
FIG. 3 is a graph that plots an angle of wellbore to fracture density in accordance with the disclosed embodiments.

As an example illustration, FIG. 3 depicts a graph 300 that plots fracture density related to the drilling data associated with one or more wells in accordance with the disclosed embodiments. In the depicted embodiment, the x-axis represents an angle, from 0° to 90°, between the orientation of the horizontal wellbore and the orientation of the fractures. On the y-axis, the graph 300 plots the number of fracture per foot encountered (i.e., fracture density). As depicted in graph 300, as the angle between the orientation on the horizontal wellbore and the orientation of the fracture approaches 90°, the fracture density of the wellbore increases. Thus, in an ideal scenario, the process 200 would drill exactly perpendicular to the fractures as that encounters the most fractures in the rock reservoir.

As previously mentioned, the fracture density of wells in different regions or quadrants of a certain area may vary in fracture orientation. For example, graph 300 provides an exemplary illustration of the possible linear relationship between fracture density and angle of wellbore to fracture orientation for a first region 310 and a second region 320. In one embodiment, the first region 310 corresponds to the Southwest region of the United States, whereas the second region 320 corresponds to the Northeast region of the United States. In this scenario, as shown in FIG. 3, wells in the Southwest region of the United States has a higher fracture density than wells in the Northeast region of the United States.

Figure 4:
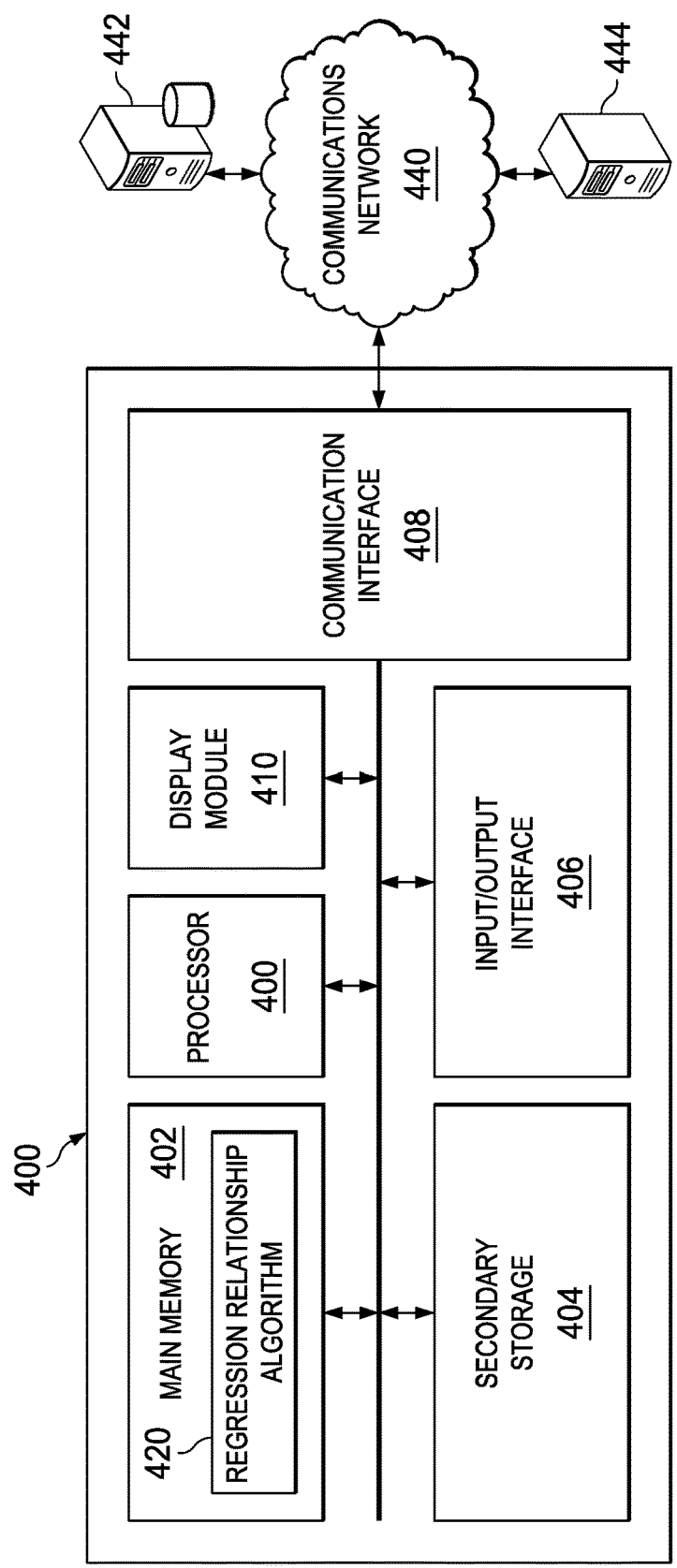
FIG. 4 is a block diagram illustrating one embodiment of a system for implementing the disclosed embodiments.

FIG. 4 is a block diagram illustrating one embodiment of a system 400 for implementing the features and functions of the disclosed embodiments. The system 400 includes, among other components, a processor 400, main memory 402, secondary storage unit 404, an input/output interface module 406, and a communication interface module 408. The processor 400 may be any type or any number of single core or multi-core processors capable of executing instructions for performing the features and functions of the disclosed embodiments.

The input/output interface module 406 enables the system 400 to receive user input (e.g., from a keyboard and mouse) and output information to one or more devices such as, but not limited to, printers, external data storage devices, and audio speakers. The system 400 may optionally include a separate display module 410 to enable information to be displayed on an integrated or external display device. For instance, the display module 410 may include instructions or hardware (e.g., a graphics card or chip) for providing enhanced graphics, touchscreen, and/or multi-touch functionalities associated with one or more display devices.

Main memory 402 is volatile memory that stores currently executing instructions/data or instructions/data that are prefetched for execution. The secondary storage unit 404 is non-volatile memory for storing persistent data. The secondary storage unit 404 may be or include any type of data storage component such as a hard drive, a flash drive, or a memory card. In one embodiment, the secondary storage unit 404 stores the computer executable code/instructions and other relevant data for enabling a user to perform the features and functions of the disclosed embodiments.

For example, in accordance with the disclosed embodiments, the secondary storage unit 404 may permanently store the executable code/instructions of the above-described regression relationship approach algorithm 420. The instructions associated with the regression relationship approach algorithm 420 are then loaded from the secondary storage unit 404 to main memory 402 during execution by the processor 400 for performing the disclosed embodiments.

The communication interface module 408 enables the system 400 to communicate with the communications network 430. For example, the network interface module 408 may include a network interface card and/or a wireless transceiver for enabling the system 400 to send and receive data through the communications network 430 and/or directly with other devices.

The communications network 430 may be any type of network including a combination of one or more of the following networks: a wide area network, a local area network, one or more private networks, the Internet, a telephone network such as the public switched telephone network (PSTN), one or more cellular networks, and wireless data networks. The communications network 430 may include a plurality of network nodes (not depicted) such as routers, network access points/gateways, switches, DNS servers, proxy servers, and other network nodes for assisting in routing of data/communications between devices.

For example, in one embodiment, the system 400 may interact with one or more servers 434 or databases 432 for performing the features of the present invention. For instance, the system 400 may query the database 432 to identify the orientation of the fractures for the previously drilled well in accordance with the disclosed embodiments. Further, in certain embodiments, the system 400 may act as a server system for one or more client devices or a peer system for peer to peer communications or parallel processing with one or more devices/computing systems (e.g., clusters, grids).

Thus, the disclosed embodiments provide a process for improving well production using a regression relationship approach. Advantages of the disclosed embodiments include, but are not limited to, providing a validation process on the prediction of fracture orientation of a well, and increasing production from a well, which increases profits.

While specific details about the above embodiments have been described, the above hardware and software descriptions are intended merely as example embodiments and are not intended to limit the structure or implementation of the disclosed embodiments. For instance, although many other internal components of the system 400 are not shown, those of ordinary skill in the art will appreciate that such components and their interconnection are well known.

In addition, certain aspects of the disclosed embodiments, as outlined above, may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming Additionally, the flowchart and block diagrams in the figures illustrate the architecture, functionality, and operation of possible implementations of systems, methods and computer program products according to various embodiments of the present invention. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In summary, the disclosed embodiments include a method, apparatus, and computer program product for improving well production using a regression relationship approach. For example, one embodiment is a computer-implemented method that includes the step of analyzing a first set of data from at least one previously drilled well to predict fracture orientation for determining a drilling angle for drilling a new well. In one embodiment, the above step includes determining an area from the first set of data where a highest fracture density occurs along a horizontal wellbore, determining an angle of the wellbore at the determined area, and estimating a fracture orientation as being perpendicular to the determined angle of the wellbore at the determined area.

In certain embodiments, the computer-implemented method may further include the steps of receiving a second set of data from drilling of a new well. In accordance with the disclosed embodiments, the new well is drilled at a predicted perpendicular angle to the estimated fracture orientation determined from the first set of data associated with the at least one previously drilled wells. In some embodiments, the first set of data is restricted to only data associated with previously drilled wells that are in the same region as that of the new well.

In addition, in some embodiments, the computer-implemented method may further include determining whether the estimated fracture orientation is an accurate prediction of a fracture orientation of the new well. In performing this determination, in one embodiment, the method may compare the fracture density along the new wellbore to a predetermined fracture density threshold value indicative of an accurate prediction.

In another embodiment, a non-transitory computer readable medium comprising computer executable instructions for analyzing a first set of data from at least one previously drilled well to predict fracture orientation for determining a drilling angle to optimize drilling of a new well. The computer executable instructions when executed causes one or more machines to perform operations comprising receiving a set of data related to at least one previously drilled well for performing fracture orientation analysis and identifying an area having a high fracture density along the horizontal wellbore. The computer executable instructions further includes instructions for determining an angle of the wellbore at the identified area and estimating a fracture orientation as being perpendicular to the determined angle of the wellbore at the determined area.

In certain embodiments, the computer executable instructions also include instructions for retrieving or receiving the determined fracture orientation information and setting and/or controlling the drilling angle during drilling of new wellbore such that the new wellbore is substantially perpendicular to the predicted fracture orientation.

In one embodiment, the computer executable instructions may further include instructions to receive and/or retrieve data associated with drilling of the new wellbore and determine the accuracy of the estimated fracture orientation. In certain embodiments, the instructions may be executed in real time during the drilling process. Alternatively, and/or in addition to, the instructions may be executed post drilling of the new wellbore.

Another embodiment of the disclosed inventions is a system that includes at least one processor and at least one memory coupled to the at least one processor and storing instructions that when executed by the at least one processor performs operations for analyzing a first set of data from at least one previously drilled well to predict fracture orientation for determining a drilling angle to optimize drilling of a new well by increasing fracture density along the new wellbore as described in above disclosure. For instance, in one embodiment, the operations includes the steps of receiving a set of data related to at least one previously drilled well for performing fracture orientation analysis, identifying area having a high fracture density along the horizontal wellbore, determining an angle of the wellbore at the identified area and estimating a fracture orientation as being perpendicular to the determined angle of the wellbore at the determined area.

The above system embodiment may further include operations comprising, but not limited to, receiving a second set of data from drilling of a new well and determining the accuracy of the estimated fracture orientation.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to explain the principles of the invention and the practical application, and to enable others of ordinary skill in the art to understand the invention for various embodiments with various modifications as are suited to the particular use contemplated. The scope of the claims is intended to broadly cover the disclosed embodiments and any such modification.

The invention claimed is:

1. A computer-implemented method for improving well production, the method comprising:
   receiving, by a computer system, a first set of data from at least a portion of a horizontal wellbore being drilled within a formation, the first set of data including image logs of the formation surrounding the horizontal wellbore;
   identifying, by the computer system, an area of the formation having a relatively high fracture density along the drilled portion of the horizontal wellbore, based on the first set of data;
   determining, by the computer system, an angle of the drilled portion of the horizontal wellbore at the identified area of the formation;
   estimating, by the computer system, a fracture orientation for fractures within the identified area of the formation relative to the determined angle of the drilled portion of the horizontal wellbore at the identified area;
   determining, by the computer system, a drilling angle for a new portion of the horizontal wellbore to be drilled within the formation, based on the estimated fracture orientation relative to the angle of the drilled portion of the horizontal wellbore; and
   drilling the new portion of the horizontal wellbore within the formation according to the determined drilling angle.

2. The computer-implemented method of claim 1, wherein the estimated fracture orientation is perpendicular to the determined angle of the previously drilled horizontal wellbore at the identified area.

3. The computer-implemented method of claim 2, further comprising:
   receiving a second set of data from drilling of the new portion of the horizontal wellbore, wherein drilling of the new portion of the horizontal wellbore is performed at a predicted perpendicular angle to the estimated fracture orientation; and
   determining an accuracy of the estimated fracture orientation relative to the predicted perpendicular angle of the new portion of the horizontal wellbore, based on the second set of data.

4. The computer-implemented method of claim 3, wherein the estimated fracture orientation is determined to be an accurate estimate of the fracture orientation in response to a determination from the second set of data that a fracture density of a second area of the formation along the new portion of the horizontal wellbore is above a predetermined fracture density threshold.

5. The computer-implemented method of claim 3, wherein the first set of data further comprises data from a plurality of previously drilled wells.

6. The computer-implemented method of claim 5, wherein the plurality of previously drilled wells are located in a same regional area as the horizontal wellbore.

7. The computer-implemented method of claim 6, wherein the same regional area is a Northeast region of the United States.

8. The computer-implemented method of claim 6, wherein the same regional area is a Southwest region of the United States.

9. A system, comprising:
   at least one processor; and
   at least one memory coupled to the at least one processor and storing computer executable instructions for improving well production, the computer executable instructions comprises instructions, which, when executed by the processor, cause the processor to perform operations for:
      receiving a first set of data from at least a portion of a horizontal wellbore being drilled within a formation, the first set of data including image logs of the formation surrounding the horizontal wellbore;
      identifying an area of the formation having a relatively high fracture density along the drilled portion of the horizontal wellbore, based on the first set of data;
      determining an angle of the drilled portion of the horizontal wellbore at the identified area of the formation;
      estimating a fracture orientation for fractures within the identified area of the formation relative to the determined angle of the drilled portion of the horizontal wellbore at the identified area; and
      controlling a drilling angle for a new portion of the horizontal wellbore as the new portion of the horizontal wellbore is drilled within the formation, based on the estimated fracture orientation relative to the angle of the previously drilled portion of the horizontal wellbore at the identified area.

10. The system of claim 9, wherein the estimated fracture orientation is perpendicular to the determined angle of the previously drilled portion of the horizontal wellbore at the identified area.

11. The system of claim 10, wherein the operations performed by the processor further comprise operations for:
    receiving a second set of data from drilling of the new portion of the horizontal wellbore, wherein drilling of the new portion of the horizontal wellbore is performed at a predicted perpendicular angle to the estimated fracture orientation; and
    determining an accuracy of the estimated fracture orientation relative to the predicted perpendicular angle of the new portion of the horizontal wellbore, based on the second set of data.

12. The system of claim 11, wherein the estimated fracture orientation is determined to be an accurate estimate of the fracture orientation in response to a determination from the second set of data that a fracture density of a second area of the formation along the new portion of the horizontal wellbore is above a predetermined fracture density threshold.

13. The system of claim 12, wherein the first set of data further comprises data from a plurality of previously drilled wells.

14. The system of claim 13, wherein the plurality of previously drilled wells are located in a same regional area as the horizontal wellbore.

15. A non-transitory computer readable medium comprising computer executable instructions which, when executed by one or more processors, cause the one or more processors to perform operations comprising:
    receiving a first set of data from at least a portion of a horizontal wellbore being drilled within a formation, the first set of data including image logs of the formation surrounding the horizontal wellbore;
    identifying an area of the formation having a relatively high fracture density along the previously drilled horizontal wellbore, based on the first set of data;
    determining an angle of the drilled portion of the horizontal wellbore at the identified area of the formation;
    estimating a fracture orientation for fractures within the identified area of the formation relative to the determined angle of the drilled portion of the horizontal wellbore at the identified area; and controlling a drilling angle for a new portion of the horizontal wellbore as the new portion of the horizontal wellbore is drilled within the formation, based on the estimated fracture orientation relative to the angle of the previously drilled portion of the horizontal wellbore at the identified area.

16. The non-transitory computer readable medium of claim 15, wherein the estimated fracture orientation is perpendicular to the determined angle of the previously drilled portion of the horizontal wellbore at the identified area.

17. The non-transitory computer readable medium of claim 16, wherein the operations performed by the one or more processors further comprise operations for:
  receiving a second set of data from drilling of the new portion of the horizontal wellbore, wherein drilling of the new horizontal wellbore is performed at a predicted perpendicular angle to the estimated fracture orientation; and
  determining an accuracy of the estimated fracture orientation relative to a the predicted perpendicular angle of the new portion of the horizontal wellbore, based on the second set of data.

18. The non-transitory computer readable medium of claim 17, wherein the estimated fracture orientation is determined to be an accurate estimate of the fracture orientation in response to a determination from the second set of data that a fracture density of a second area of the formation along the new portion of the horizontal wellbore is above a predetermined fracture density threshold.

19. The non-transitory computer readable medium of claim 17, wherein the first set of data further comprises data from a plurality of previously drilled wells.

20. The non-transitory computer readable medium of claim 19, wherein the plurality of previously drilled wells are located in a same regional area as the horizontal wellbore.

* * * * *